United States Patent
Ghosh et al.

(10) Patent No.: US 9,180,441 B2
(45) Date of Patent: Nov. 10, 2015

(54) METHOD OF FORMING ZEOLITE SHAPED BODY WITH SILICA BINDER

(71) Applicant: SAUDI BASIC INDUSTRIES CORPORATION, Riyadh (SA)

(72) Inventors: Ashim Kumar Ghosh, Houston, TX (US); Corina Mihut, Sugar Land, TX (US); Meghann Simmons, Katy, TX (US)

(73) Assignee: SAUDI BASIC INDUSTRIES CORPORATION, Riyadh (SA)

(*) Notice: Subject to any disclaimer, the term of this patent is extended or adjusted under 35 U.S.C. 154(b) by 391 days.

(21) Appl. No.: 13/623,250

(22) Filed: Sep. 20, 2012

(65) Prior Publication Data

US 2014/0080696 A1  Mar. 20, 2014

(51) Int. Cl.
| | | |
|---|---|---|
| *B01J 29/06* | (2006.01) | |
| *B01J 35/00* | (2006.01) | |
| *B01J 37/00* | (2006.01) | |
| *C04B 35/19* | (2006.01) | |
| *C04B 35/63* | (2006.01) | |
| *C04B 35/634* | (2006.01) | |
| *B01J 29/40* | (2006.01) | |
| *B01J 29/04* | (2006.01) | |

(52) U.S. Cl.
CPC .............. *B01J 35/002* (2013.01); *B01J 29/061* (2013.01); *B01J 29/40* (2013.01); *B01J 37/0009* (2013.01); *B01J 37/0018* (2013.01); *C04B 35/19* (2013.01); *C04B 35/6316* (2013.01); *C04B 35/63416* (2013.01); *C04B 35/63468* (2013.01); *B01J 29/047* (2013.01); *B01J 2229/42* (2013.01); *C04B 2235/3206* (2013.01); *C04B 2235/3287* (2013.01); *C04B 2235/3418* (2013.01); *C04B 2235/3472* (2013.01); *C04B 2235/422* (2013.01); *C04B 2235/425* (2013.01); *C04B 2235/6021* (2013.01)

(58) Field of Classification Search
USPC .............................................. 502/62, 64, 71
See application file for complete search history.

(56) References Cited

U.S. PATENT DOCUMENTS

| | | | |
|---|---|---|---|
| 3,702,886 A | 11/1972 | Argauer et al. | |
| 4,239,615 A | 12/1980 | Tu | |
| 4,417,083 A | 11/1983 | Bernard et al. | |
| 4,435,283 A | 3/1984 | Buss et al. | |
| 4,485,185 A | 11/1984 | Onodera et al. | |
| 4,517,306 A | 5/1985 | Buss | |
| 4,652,360 A | 3/1987 | Dessau | |
| 4,839,027 A | 6/1989 | Absil et al. | |
| 4,867,864 A | 9/1989 | Dessau | |
| 4,925,819 A | 5/1990 | Fung et al. | |
| 5,053,374 A | 10/1991 | Absil et al. | |
| 5,114,565 A | 5/1992 | Zones et al. | |
| 5,328,595 A | 7/1994 | Rainis | |
| 5,500,109 A | 3/1996 | Keville et al. | |
| 5,552,035 A | 9/1996 | Potter et al. | |
| 5,976,490 A | 11/1999 | Wendelbo | |
| 6,709,570 B1 | 3/2004 | Van Crijnen-Beers et al. | |
| 6,784,333 B2 | 8/2004 | Juttu et al. | |
| 7,153,801 B2 | 12/2006 | Wu | |
| 7,582,583 B2 | 9/2009 | Bosch et al. | |
| 7,601,330 B2 | 10/2009 | Wang et al. | |
| 7,651,968 B2 | 1/2010 | Bosch et al. | |
| 7,893,311 B2 | 2/2011 | Takamatsu et al. | |
| 7,902,103 B2 | 3/2011 | Beekman et al. | |
| 7,902,413 B2 | 3/2011 | Stevenson et al. | |
| 7,906,696 B2 | 3/2011 | Juttu et al. | |
| 2008/0255398 A1 | 10/2008 | Stevenson et al. | |
| 2008/0293989 A1 | 11/2008 | Khanmamedova et al. | |
| 2008/0293990 A1 | 11/2008 | Stevenson et al. | |
| 2009/0156871 A1 | 6/2009 | Khare | |
| 2010/0063341 A1 | 3/2010 | Heng et al. | |
| 2010/0206775 A1 | 8/2010 | Beeckman et al. | |
| 2011/0132804 A1 | 6/2011 | Stevenson et al. | |
| 2011/0192766 A1 | 8/2011 | McCarthy et al. | |
| 2011/0282122 A1 | 11/2011 | Wang et al. | |
| 2013/0296625 A1 | 11/2013 | Ghosh et al. | |

FOREIGN PATENT DOCUMENTS

| | | |
|---|---|---|
| CN | 102039165 A | 5/2011 |
| CN | 102039168 A | 5/2011 |
| EP | 0145289 A2 | 6/1985 |
| EP | 1115657 B1 | 5/2003 |
| GB | 1305137 A | 1/1973 |
| JP | 04188050 B2 | 11/2008 |
| WO | WO94/13584 | 6/1994 |

OTHER PUBLICATIONS

International Search Report for counterpart International Application No. PCT/US2012/067524, Jun. 7, 2013, pp. 1-5, received from International Searching Authority.
Written Opinion of the International Searching Authority for counterpart International App. No. PCT/US2012/067524, Jun. 7, 2013, pp. 1-8, International Searching Authority.

*Primary Examiner* — Elizabeth Wood
(74) *Attorney, Agent, or Firm* — Cantor Colburn LLP

(57) ABSTRACT

A method of forming a zeolite shaped body is carried out by preparing an aqueous mixture containing a zeolite, a silica binder material and an extrusion aid. The extrusion aid is at least one of PVAc-PVA1 (80-89) and polyacrylamide. The mixture is formed into a body having a selected shape. The shaped body is heated to form the zeolite shaped body.

20 Claims, 1 Drawing Sheet

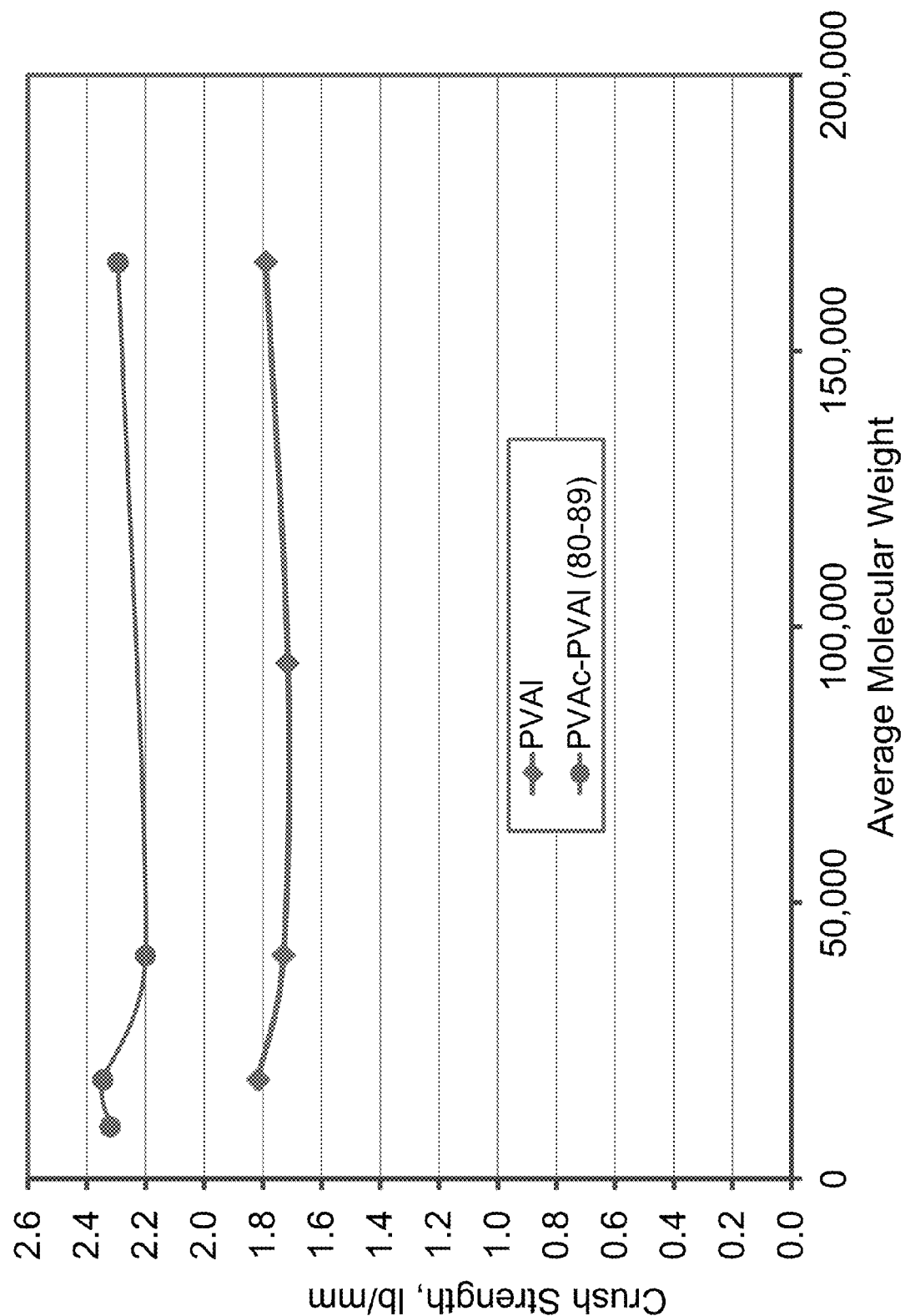

METHOD OF FORMING ZEOLITE SHAPED BODY WITH SILICA BINDER

TECHNICAL FIELD

The invention relates generally to zeolite catalysts and their preparation.

BACKGROUND

Zeolites or molecular sieves used for catalysts are often formed into shaped body by binding with binder materials. Commonly used binder materials include alumina, silica, silica-alumina, clay, or combinations of these materials. When using shaped catalyst it is important that the catalyst has sufficient physical integrity during its use in commercial reactors. Without sufficient physical strength, the catalyst can be damaged or degrade, creating fines and debris that can have negative consequences on the reaction and the reactor equipment. Several measurements are performed to determine physical integrity of a shaped catalyst. Such measurements include attrition resistance, bulk crush strength, particle crush strength, etc.

Certain binder materials may impart better physical or mechanical properties to the shaped zeolite catalyst than others. The particular binder material used, however, may also affect the reaction or reactions, making the use of certain binders that provide better strength unsuitable in certain applications. For example, certain reactions are affected by acidity. Although alumina, which is a commonly used as a binder material, has weak acidity, the weak acidity can still affect certain reactions. Silica has low or no acidity making it useful as a binder in those reactions that are affected by acidity. Catalyst bound with silica, however, may have lower physical strength than other binder materials.

Accordingly a need exists for improving the mechanical properties of silica bound zeolite catalysts.

SUMMARY

A method of forming a zeolite shaped body is achieved by preparing a mixture containing a zeolite, a silica binder material and an extrusion aid of at least one of PVAc-PVA1 (80-89) and polyacrylamide. The mixture is formed into a body having a selected shape and heated to form the zeolite shaped body.

In certain applications, the silica binder material is comprised of solid silica and colloidal silica. Heating of the shaped mixture may include calcining.

In certain embodiments, the PVAc-PVA1 (80-89) may have an average molecular weight (MW) of from 500 to 500,000, and in others the PVAc-PVA1 (80-89) may have an average molecular weight (MW) of from 10,000 to 200,000.

The silica binder material may be used in an amount so that the zeolite shaped body has from 1% to 99% silica binder by weight of the zeolite shaped body. The silica binder material may be used in an amount so that the zeolite shaped body has from 10% to 60% silica binder by weight of the zeolite shaped body.

In certain embodiments, the extrusion aid may be used in an amount of from 0.1% to 5% by weight of the mixture. In others, the extrusion aid may be used in an amount of from 1% to 2% by weight of the mixture.

Any non-silica binder materials may be used in an amount to provide less than 10% by total weight of the zeolite shaped body in certain applications. In other applications, any non-silica binder materials may be used in an amount to provide less than 5% by total weight of the binder materials in the zeolite shaped body. In still other applications, any non-silica binder materials may be used in an amount to provide less than 1% by total weight of the binder materials in the zeolite shaped body.

The zeolite may be a pentasil type zeolite in certain instances. In some embodiments, the zeolite may contain a structure directing templating agent. In other embodiments, the zeolite may be a heat treated zeolite that contains no templating agent. The zeolite may be acidic or non-acidic.

In forming the zeolite shaped body, the mixture may further comprise at least one other extrusion aid that is not a PVAc-PVA1 (80-89) or polyacrylamide extrusion aid. The at least one other extrusion aid may be selected from the group consisting of a PVA1, a PVAc, a PVAc-PVA1 which is hydrolyzed to a level outside of the range of 80%-89%, magnesium stearate, carbon, and graphite powder.

In another aspect of the invention, a zeolite shaped body is formed by preparing a mixture containing a zeolite, a silica binder material and an extrusion aid of PVAc-PVA1 (80-89). The mixture is formed into a body having a selected shape and heated to form the zeolite shaped body.

In certain applications, the silica binder material is comprised of solid silica and colloidal silica. Heating of the shaped mixture may include calcining.

In certain embodiments, the PVAc-PVA1 (80-89) may have an average molecular weight (MW) of from 500 to 500,000, and in others the PVAc-PVA1 (80-89) may have an average molecular weight (MW) of from 10,000 to 200,000.

The silica binder material may be used in an amount so that the zeolite shaped body has from 1% to 99% silica binder by weight of the zeolite shaped body. The silica binder material may be used in an amount so that the zeolite shaped body has from 10% to 60% silica binder by weight of the zeolite shaped body.

In certain embodiments, the extrusion aid may be used in an amount of from 0.1% to 5% by weight of the mixture. In others, the extrusion aid may be used in an amount of from 1% to 2% by weight of the mixture.

Any non-silica binder materials may be used in an amount to provide less than 10% by total weight of the zeolite shaped body in certain applications. In other applications, any non-silica binder materials may be used in an amount to provide less than 5% by total weight of the binder materials in the zeolite shaped body. In still other applications, any non-silica binder materials may be used in an amount to provide less than 1% by total weight of the binder materials in the zeolite shaped body.

The zeolite may be a pentasil type zeolite in certain instances. In some embodiments, the zeolite may contain a structure directing templating agent. In other embodiments, the zeolite may be a heat treated zeolite that contains no templating agent. The zeolite may be acidic or non-acidic.

In forming the zeolite shaped body, the mixture may further comprise at least one other extrusion aid that is not a PVAc-PVA1 (80-89). The at least one other extrusion aid may be selected from the group consisting of a polyacrylamide, a PVA1, a PVAc, a PVAc-PVA1 hydrolyzed to a level outside of the range of 80%-89%, magnesium stearate, carbon, and graphite powder.

In another embodiment of the invention, a zeolite shaped body is formed by preparing a mixture containing a zeolite, a silica binder material and a polyacrylamide. The mixture is formed into a body having a selected shape and heated to form the zeolite shaped body.

In certain applications, the silica binder material is comprised of solid silica and colloidal silica. Heating of the shaped mixture may include calcining. The silica binder material may be used in an amount so that the zeolite shaped body has from 1% to 99% silica binder by weight of the zeolite shaped body. The silica binder material may be used in an amount so that the zeolite shaped body has from 10% to 60% silica binder by weight of the zeolite shaped body.

In certain embodiments, the extrusion aid may be used in an amount of from 0.1% to 5% by weight of the mixture. In others, the extrusion aid may be used in an amount of from 1% to 2% by weight of the mixture.

Any non-silica binder materials may be used in an amount to provide less than 10% by total weight of the zeolite shaped body in certain applications. In other applications, any non-silica binder materials may be used in an amount to provide less than 5% by total weight of the binder materials in the zeolite shaped body. In still other applications, any non-silica binder materials may be used in an amount to provide less than 1% by total weight of the binder materials in the zeolite shaped body.

The zeolite may be a pentasil type zeolite in certain instances. In some embodiments, the zeolite may contain a structure directing templating agent. In other embodiments, the zeolite may be a heat treated zeolite that contains no templating agent. The zeolite may be acidic or non-acidic.

In forming the zeolite shaped body, the mixture may further comprise at least one other extrusion aid that is not a polyacrylamide extrusion aid. The at least one other extrusion aid may be selected from the group consisting of a PVA1, a PVAc, a PVAc-PVA1, a PVAc-PVA1 (80-89), magnesium stearate, carbon, and graphite powder.

BRIEF DESCRIPTION OF THE DRAWINGS

For a more complete understanding of the present invention, reference is now made to the following descriptions taken in conjunction with the accompanying figures, in which:

FIG. 1 is a plot of the averaged crush strengths of Ge-ZSM-5 zeolite shaped bodies as a function of the average molecular weight of different extrusion aids of near complete hydrolyzed polyvinyl alcohol (PVA1) and polyvinyl alcohol at 80%-89% hydrolyzation (PVAc-PVA1 (80-89)), used in forming the Ge-ZSM-5 zeolite shaped bodies.

DETAILED DESCRIPTION

In the present invention, a method is disclosed for the formation of a shaped body (e.g., cylindrical shaped extrudate) of a zeolite or a zeolite-type material or a zeolite-containing material with a silica-containing material as a binder. The zeolite or zeolite-containing material may be any zeolite or combination of zeolites or zeolite-containing material. A zeolite is a crystalline hydrated aluminosilicate that has a tetrahedra structure of the formula $TO_4$. The tetrahedra structure is in the form of a three-dimensional network that is formed by sharing oxygen atoms and wherein T represents tetravalent atoms, such as silicon, and trivalent atoms, such as aluminum.

In the present invention, the zeolite can be an Al substituted zeolite, e.g., B-ZSM-5, wherein Al is substituted by boron (B) in the framework. Such substitution can be either partial, complete, or substantial complete substitution by other tetravalent or trivalent atoms in the structure. Non-limiting examples of such substituted atoms include the tetravalent or trivalent elements of boron (B), iron (Fe), gallium (Ga), germanium (Ge), thallium (Tl), tin (Sn), and combinations of these.

In the crystalline structure of the zeolite there are pores and channels that may be interconnected. The dimensions and configuration of these pores and channels allow access of molecules of certain sizes or configurations, thus promoting the selectivity to certain products when the zeolite is used as a catalyst. The zeolite may be naturally occurring or synthetic. Elements, such as metals, may also be deposited on or incorporated with the zeolite to facilitate selectivity or catalytic enhancement of the zeolite catalyst. In the present invention, the zeolite may be an unmodified zeolite or a modified zeolite, wherein the zeolite material has been treated with one or more compounds to modify the properties of the zeolite. Furthermore, the zeolites may be those having small, medium or large pore sizes, having one, two, or three-dimensional pore structure zeolites.

In certain embodiments, the zeolites useful in this invention are large pore zeolites. In other embodiments, the zeolites are medium pore zeolites. In still other embodiments, the zeolites are small pore zeolites. The term "medium pore" means a zeolite having an average pore size that is in the range of from about 5 Å to about 7 Å. The term "large pore" means a zeolite having an average pore size that is in the range of from about 7 Å to about 10 Å. It is possible that these ranges could overlap and a particular zeolite might be considered either a medium pore zeolite or a large pore zeolite. Small pore zeolites have an average pore size of less than about 5 Å.

It should be understood that with respect to any concentration or amount range listed or described in the summary and detailed description as being useful, suitable, or the like, it is intended to include every concentration or amount within the range, including the end points, and is to be considered as having been specifically stated. For example, "a range of from 1 to 10" is to be read as indicating each and every possible number along the continuum between about 1 and about 10. Thus, even if specific data points within the range, or even no data points within the range, are explicitly identified or refer to only a specific few, it is to be understood that the inventors appreciate and understand that any and all data points within the range are to be considered to have been specified, and that the inventors are in possession of the entire range and all points within the range.

Examples of medium and large pore zeolites include ZSM-5, ZSM-11, ZSM-23, Silicalite, Mordenite, Beta, Zeolite-L, Zeolite X and Y, etc. The foregoing list of medium and large pore zeolites is merely illustrative and not exhaustive, and others may be used and should be considered within the scope of the invention.

The zeolites useful in the invention may include those having different pore sizes. Some zeolites have two distinct channels of different sizes, e.g., mordenite has a 12-ring channel that is 7.0 Å×6.5 Å as well as an 8-ring channel that is <5 Å. Multichannel zeolites which have at least one channel within the ranges above for a medium pore zeolite and/or a large pore zeolite are considered within the scope of zeolites useful for the present invention.

In certain embodiments, the zeolite may be one of those from the family of pentasil zeolites that contain five membered ring units or pentasil units in the framework structure. Such zeolites include ZSM-5, ZSM-11, ZSM-23, ferrierite, mordenite, beta, etc. In particular, the zeolite may be a pentasil zeolite that contains 10-membered ring pore openings in the structure. Zeolites with 10-membered ring pore openings are also known as medium pore zeolites. Examples of such pentasil zeolite containing 10-membered ring pore openings or medium pores are ZSM-5, ZSM-11, etc.

Silicalites have an isotypic framework of ZSM-5 zeolite or have the same or similar crystalline structures of ZSM-5 zeolite. Unlike ZSM-5 zeolites, silicalites contain no or very little aluminum in the framework structure. For instance, U.S. Pat. No. 4,061,724, incorporated herein by reference in its entirety for all purposes, describes such compounds. Such silica compounds are known in the art as "silicalites." Silicalites are also described in the article presented in Nature, Vol. 271, *Silicalite, A New Hydrophobic Crystalline Silica Molecular Sieve*, E. M. Flanigen, et al., (February 1978), pp. 512-516, which is herein incorporated by reference for all purposes. Such silicalites are formed from precursors of silica materials that contain little or no alumina ($Al_2O_3$). As used herein, the term "zeolite" is also meant to include silicalites, unless stated otherwise or is otherwise apparent from the context.

Of the pentasil zeolites, ZSM-5 zeolite is one of the most versatile and commonly used zeolites as a catalyst in various reactions. Because of this, the invention may have particular application to ZSM-5 zeolites. The ZSM-5 zeolite and its preparation are described in U.S. Pat. No. 3,702,886, which is herein incorporated by reference. The invention has application to other pentasil zeolites, however, such as those previously discussed. The ZSM-5 zeolite has a two-dimensional pore structure consisting of straight channels (5.4 Å×5.6 Å) that are intersected by sinusoidal channels (5.1 Å×5.7 Å), with a maximum diameter of about 9 Å at the intersection.

In the present invention, a Ge-ZSM-5 (wherein Al is partially or substantially completely substituted by germanium (Ge) in the structure) is used and discussed herein as an exemplary zeolite. An example of Ge-ZSM-5 zeolites and their preparation are described in U.S. Pat. No. 7,449,168, which is incorporated herein by reference for all purposes.

The zeolite in the present invention can be as-synthesized, heat-treated, or further modified. In certain embodiments, the zeolite of the present invention is as-synthesized zeolite. Structure directing templating agents such as tetraethylammonium ($TEA^+$), tetrapropylammonium ($TPA^+$) or other cations can be present in the as-synthesized zeolite. In other embodiments, the zeolite can be a heat treated or detemplated zeolite. The templating agent can be removed, for example, by heating the zeolite at a temperature of 400° C. to 600° C., such that the zeolite can be detemplated and subsequently ion-exchanged. The zeolite can be $H^+$ or $NH_4^+$ form, or may contain metal ions, for example, alkali or alkaline earth metal ions.

In certain embodiments, the zeolite of the present invention may be non-acidic. With respect to the zeolite, one meaning for the term "non-acidic" means a zeolite that has been base-exchanged with an alkali metal or alkaline earth metal, such as cesium, potassium, sodium, rubidium, barium, calcium, magnesium, lithium and mixtures thereof, to reduce acidity. Base-exchange may take place during synthesis of the zeolite with an alkali metal or alkaline earth metal being added as a component of the reaction mixture or may take place with a crystalline zeolite before, after, or simultaneous with other modifications, such as deposition of metals. In such cases, the zeolite is base-exchanged to the extent where most or all of the cations associated with aluminum are alkali metals or alkaline earth metals. In certain embodiments, a monovalent base:aluminum atomic ratio in the zeolite after base exchange is at least about 0.9. In other embodiments, the monovalent metal is present in a monovalent-metal to aluminum atomic ratio ranging from 1 to 2.

Another meaning of "non-acidic" with respect to the zeolite means an aluminum-free zeolite. An aluminum-free zeolite need not be base-exchanged to be non-acidic. The aluminum-free zeolites may contain another tetravalent or trivalent element, such as titanium, iron, gallium, boron, germanium or tin. Silicalites constitute such aluminum-free zeolites. As used herein, "aluminum-free" means zeolites having an aluminum content of no more than 0.4 wt %. Within the meaning and for the purposes of the present invention, a zeolite may be "non-acidic" by exchange with a base or by being aluminum free or having a low aluminum content.

In the present invention, the zeolite powder is formed into a shaped body by binding with a silica-containing material as a binder. Such silica binder contains both solid silica powder and colloidal silica, which together constitute the silica binder. In certain embodiment, the solid silica powder used may be about 100% $SiO_2$ with traces of impurities. In other embodiments, the solid silica powder may contain other non-silica oxides such as $Al_2O_3$, MgO, $Fe_2O_3$, CaO, etc. In certain embodiments, the solid silica source may contain about 60-70 wt % $SiO_2$, 10-15 wt % $Al_2O_3$, 8-12 wt % MgO, 3-5 wt % $Fe_2O_3$, 0.8-1.0 wt % $TiO_2$, 0.8-1.0 wt % $P_2O_5$, 2-4 wt % CaO, 0.5-1.5 wt % $K_2O$, and may also contain small amounts of C and S compounds. Attapulgite is an exemplary example of such silica containing non-silica oxides. A commercial source of attapulgite is that marketed as MIN-U-GEL®, a registered trademark of Active Minerals International, LLC and available from Active Minerals International, LLC. The total non-silica oxides present as binder in the zeolite shaped body or catalyst may be less than 10 wt % or less than 5 wt % of the shaped body or final catalyst.

In the present invention, the silica binder materials may be used because they are non-acidic or substantially non-acidic, providing no or only a limited or insignificant amount acidity. Catalyst formed with such silica binder provides no significant acid-cracking side reaction(s) producing lower light hydrocarbons and thus resulting in an increased selectivity for higher hydrocarbons. For instance, U.S. patent application Ser. No. 13/462,230, filed May 2, 2012, which is incorporated herein by reference in its entirety for all purposes, describes one such reaction for converting light naphtha, such as n-hexane, to benzene over a ZSM-5 catalyst containing silica binder. Other non-silica binder materials may also be used along with the silica binder material, but such materials may be limited. Such non-silica binder materials should not be used in amounts that significantly impact the low acid properties of the silica binder. Non-limiting examples of non-silica binder materials may include alumina binders, silica-alumina binders, clay binders, magnesium oxide binders, calcium oxide binders, etc., or combinations of these. If any non-silica binder materials are used they may be present with the silica binder in an amount to provide less than 10 wt %, 5 wt %, 1% or less by total weight of the formed catalyst.

The solid silica may be a crystalline or an amorphous silica, or a combination of these. A non-limiting example of a suitable commercially available solid silica is that marketed as ULTRASIL® VN3 SP, a synthetic amorphous silica, available from Degussa Corporation. Specific BET surface area ($N_2$) of the ULTRASIL® VN3 SP silica is 180 $m^2/g$ and contains impurities about 2 wt % (Fe, Cu, etc). Another suitable solid silica is that available as DAVISIL-643 silica, which is available from Sigma-Aldrich. DAVISIL-643 silica is a high purity (99.4%) silica and has high surface area (300 $m^2/g$).

The colloidal silica used for the silica binder is in the form of an aqueous solution containing silica particles in suspension. The silica particles of the colloidal silica may be crystalline silica, amorphous silica, or a combination of these. In certain instances, the silica of the colloidal silica may have a surface area less than or equal to 250 $m^2/g$. In other embodiments, the silica may have a surface area from 100 $m^2/g$ to 250 $m^2/g$. The colloidal silica may have silica with particle sizes ranging from 30 nm or less. In certain applications, the colloidal silica may have silica with particle sizes of from 10 nm to 30 nm. In still other embodiments, colloidal silica material may include a mixture of different colloidal silicas having silica of different particle sizes. Thus, in particular embodiments, a first colloidal silica in an amount of at least 10 wt %, 20 wt %, 30 wt %, 40 wt %, 50 wt %, or more of the total colloidal silica may have particle sizes of from 10 nm to 30 nm, with the remainder being a second colloidal binder having silica particle sizes of less than 10 nm. In other embodiments, a first colloidal silica in an amount of at least 10 wt %, 20 wt %, 30 wt %, 40 wt %, 50 wt %, or more of the total colloidal silica may have particle sizes of from 10 nm to 25 nm, with the remainder being a second colloidal binder having silica particle sizes of less than 10 nm. The colloidal silicas may be those that are stabilized with acid, alkali metals, $NH_4^+$, or $Na^+$. Non-limiting examples of suitable commercially available colloidal silica includes those marketed as LUDOX® AS-40, or LUDOX® SM-30, or LUDOX® AS-30, or LUDOX® HS-30, available from Sigma-Aldrich, or Nalco 1034A, available from Nalco Company.

In forming of the silica bound zeolites of the invention, the zeolite and binder materials are typically mixed together. The mixture comprising the zeolite and binder materials can be formed into the shaped body by various forming processes such as pelletizing, tableting, extruding, and any other technique of forming a catalyst into a shape, as well as a combination comprising at least two or more of the foregoing processes. The shaped bodies of the silica bound zeolites may have a variety of configurations. Examples of shaped bodies include, but are not limited to, spherical, cylindrical, and those having an oval, round, oblong, square, rectangular, diamond, polygonal shaped cross section, etc. One specific example of a shaped body is a ⅛-inch diameter cylindrically shaped extrudate.

In the present invention, particular extrusion aids are used in the zeolite and binder mixture that have been discovered provide certain desirable properties to the final zeolite shaped bodies or catalysts. Extrusion aids are typically compounds that facilitate extruding of the zeolite and binder mixture. They are typically driven off or burned during heating and/or calcinations of the shaped zeolites in forming the final shaped body.

In particular embodiments, an extrusion aid of a partially hydrolyzed polyvinyl alcohol is included in the zeolite and binder mixture. A polyvinyl alcohol is produced commercially by hydrolysis of polyvinyl acetate. The polyvinyl acetate (hereinafter denoted as PVAc) can be represented by following formula (I):

(1)

where, $R=COCH_3$. When polyvinyl acetate is hydrolyzed the acetate groups ($COCH_3$) are substituted by hydrogen so that $R=H$ to form alcohol (OH) groups along the polymer chain. Such hydrolysis of the acetate can be near completion or 100%, or the acetate can be partially hydrolyzed, for example to 90% or 80% or 70%, etc. Hereinafter, the near 100% or more specifically 98%+ hydrolyzed PVAc into polyvinyl alcohol is referred to as polyvinyl alcohol (hereinafter denoted as PVA1). In the partially hydrolyzed polyvinyl alcohol, acetate and alcohol groups are randomly distributed in the polymer chain. For example, 80% hydrolyzed polyvinyl alcohol means that the polymer contains 20% acetate groups and 80% alcohol groups. Hereinafter, the partially hydrolyzed polyvinyl alcohol is referred as "PVAc-PVA1 (N)" where N represents the percentage of vinyl acetate groups hydrolyzed to vinyl alcohol groups. For example, PVAc-PVA1 (80-89) refers to a partially hydrolyzed polyvinyl alcohol where 80% to 89% of the acetate groups are hydrolyzed to alcohol groups.

In certain embodiments, the extrusion aid of the PVAc-PVA1 (80-89) may have an average molecular weight (MW) of from 500 to 500,000. In other embodiments, the PVAc-PVA1 (80-89) may have an average MW of from 10,000 to 200,000. The PVAc-PVA1 (80-89) may be used in an amount of from 0.1% to 5% by weight of the zeolite and binder mixture. In other embodiments, the PVAc-PVA1 (80-89) may be used in an amount of from 0.5% to 3% by weight of the zeolite/binder mixture, more particular from 1% to 2% by weight of the zeolite/binder mixture.

The use of the PVAc-PVA1 (80-89) has been unexpectedly shown to greatly increase the mechanical or crush strength of the extrudate made from the zeolite and silica binder. Where extrudates of silica bound zeolites using extrusion aids of different molecular weights PVA1, they have been shown to have lower crush strengths than those using PVAc-PVA1 (80-89). This is in contrast to extrudates made with the PVAc-PVA1 (80-89) of different molecular weights that show an increase in crush strength on average of from 15%, 20%, 25% or more compared to those using PVA1.

Generally, the mechanical strength of a shaped body or catalyst is measured to ensure the catalyst's ability to retain its physical integrity during use in a reactor. For cylindrical shaped extrudates or catalysts, particle crush strength is measured by placing a piece of the extrudate between two flat plates and applying a compressive load and measuring the force required to crush the piece of the extrudate. The particle crush strength or flat plate crush strength is reported hereinafter as "crush strength" in units of lb/mm. In testing, extrudates formed using PVA1 typically had a crush strength of less than 2 lb/mm (0.91 kg/mm), whereas those extrudates employing PVAc-PVA1 (80-89) had crush strengths of greater than 2 lb/mm (0.91 kg/mm). The increase in crush strength using the PVAc-PVA1 (80-89) was provided even when other extrusion aids were used.

In another embodiment of the invention, an extrusion aid of a polyacrylamide is used in the zeolite and silica binder mixture. The polyacrylamide may be used with or without PVAc, PVA1, PVAc-PVA1 (80-89) or other extrusion aids. While the polyacrylamide may not necessarily provide a significant increase in the mechanical or crush strength of the final silica-bound zeolite extrudate, it has been shown to unexpectedly provide a consistent and narrow range of crush strengths of the final silica-bound zeolite shaped body. This is an important characteristic for commercial catalysts where predictability and reliability of the mechanical properties of the catalyst are desired.

The polyacrylamide used as extrusion aid may have an average MW of from 2 million to 10 million. In other embodiments, the polyacrylamide extrusion aid may have an average molecular weight of from 2 million to 7 million. The polyacrylamide may be used as extrusion aid in an amount of from 0.1% to 5% by weight of the zeolite and binder mixture. In other embodiments, the polyacrylamide extrusion aid may be used in an amount of from 0.5% to 3% by weight of the zeolite-binder mixture, more particularly from 1% to 2% by weight of the zeolite-binder mixture. An example of a suitable commercially available source of polyacrylamide is that sold as under the trademark CYFLOC® N-300 LMW Flocculant available from Cytec, West Peterson, N.J., which is a polyacrylamide having a MW of 2 million to 5 million.

In certain embodiments, extrusion aids of only polyacrylamide or polyvinyl acetate (PVAc) are used. In other embodiments, extrusion aids of PVAc may also be used in conjunction with the polyvinyl alcohol (PVA1) and/or PVAc-PVA1 (80-89) and/or polyacrylamide. These may include such materials as PVAc-PVA1, having hydrolysis of vinyl acetate groups of more or less than 80-89%, stearate (e.g., Mg stearate), graphite or carbon (e.g., graphite C). These extrusion aids may be used in amounts of from about 0.5% to about 5% by weight of the zeolite-binder mixture, more particularly from about 1% to about 3% by weight of zeolite-binder mixture.

To form the shaped body of zeolite powder with silica as binder, the zeolite powder, which may be non-modified or modified and may include one or more different zeolites, is mixed with the silica binder materials and extrusion aids. The silica binder materials include the solid silica and/or colloidal silica. Other binder materials may also be included in the mixture, as has been discussed. To make the mixture extrudable, water may be added to the mixture. In certain instances, the water content of the colloidal silica may be sufficient to provide an extrudable mixture. If necessary, however, additional water may be added to the mixture to form the extrudable mixture. The mixture is then extruded or otherwise formed into the desired size and shape. The extruded material is then dried and/or calcined to form the final shaped body of the silica-bound zeolite, which may be further modified, such as by metal deposition or ion-exchange for making the zeolite shaped body into the final catalyst.

The zeolite shaped body containing silica binder can be dried and calcined at a temperature between 120° C. and 600° C., specifically between 250° C. and 550° C. under an environment containing oxygen over a time period of 0.5 h or greater, specifically 2 h or greater, or more specifically 2 h to 10 h.

Such calcined zeolite shaped bodies containing silica as binder can be formed into catalysts and used in various reactions. Examples of such catalysts are Cs and Pt containing Ge-ZSM-5s, which are useful for light naphtha aromatization. The catalysts of the present invention may be used in such light naphtha aromatization methods. Examples of light naphtha aromatization methods, including reaction conditions, etc., are described in U.S. patent application Ser. No. 13/462,230, filed May 2, 2012, which is herein incorporated by reference in its entirety for all purposes.

The following examples serve to further illustrate the invention.

EXAMPLES

The materials used in the following examples are described in Table 1. Unless specifically stated otherwise, the materials are used in the form as set forth in Table 1, and the quantities identified in the examples are based upon that form.

TABLE 1

| Material | Source |
| --- | --- |
| Ge-ZSM-5[a] | Sud-Chemie |
| Min-U-Gel[b] | Active Minerals Intl. |
| Colloidal Silica, Ludox AS-30, (30 wt % SiO$_2$ in aqueous) | Sigma-Aldrich |
| Polyacrylamide (Cyfloc N-300 LMW, MW 2 million to 5 million) | Cytec |
| Polyvinyl Acetate (PVAc), Avg. MW 140,000 | Sigma-Aldrich |
| Polyvinyl Alcohol, 98% hydrolyzed, (PVAl), Avg. MW 18,000 | Sigma-Aldrich |
| Polyvinyl Alcohol, 98-99% hydrolyzed, (PVAl), Avg. MW 40,500 | Sigma-Aldrich |
| Polyvinyl Alcohol, 99+% hydrolyzed, (PVAl), Avg. MW 93,500 | Sigma-Aldrich |
| Polyvinyl Alcohol, 99+% hydrolyzed, (PVAl), Avg. MW 166,000 | Sigma-Aldrich |
| Polyvinyl Alcohol, 80% hydrolyzed, [PVAc-PVAl (80)], Avg. MW 9,500 | Sigma-Aldrich |
| Polyvinyl Alcohol, 87-89% hydrolyzed, [PVAc-PVAl (87-89)], Avg. MW 18,000 | Sigma-Aldrich |
| Polyvinyl Alcohol, 87-89% hydrolyzed, [PVAc-PVAl (87-89)], Avg. MW 40,500 | Sigma-Aldrich |
| Polyvinyl Alcohol, 87-89% hydrolyzed, [PVAc-PVAl (87-89)], Avg. MW 166,000 | Sigma-Aldrich |
| Magnesium Stearate (technical grade, 98.4%) | Sigma-Aldrich |
| Graphite Powder, −325 mesh, 99.9995% | Alfa Aesar |
| Water, Deionized (DI) | SABIC lab |

[a]As-synthesized (containing template); weight loss at 550° C. 11.22 wt %, elemental analysis (by XRF method), Si = 38.08 wt %, Al = 0.69 wt %, Ge = 5.83 wt %, Na = 0.22 wt %, Si/Al$_2$ = 106.03, Si/Ge$_2$ = 33.76, Si/(Al$_2$ + Ge$_2$) = 25.61.
[b]Min-U-Gel, weight loss at 550° C. 19.25 wt %, Composition: (wt %): 66% SiO$_2$, 11.71% Al$_2$O$_3$, 9.70% MgO, 4.02% Fe$_2$O$_3$, 0.55% TiO$_2$, 0.99% P$_2$O$_5$, 2.92% CaO, 1.07% K$_2$O, 2.57% CO$_2$, 0.25% SO$_4$.

Comparative Example 1

Different extrudable mixtures of the Ge-ZSM-5 zeolite powder and silica containing binder were prepared by mixing the zeolite, silica binder, extrusion aid and water, if needed. Specifically, about 80 g of Ge-ZSM-5 zeolite powder, about 12 g of solid binder material of Min-U-Gel® (MUG) and 1.67 g polyvinyl alcohol (PVA1) (hydrolyzed at 98% or above) were mixed together and then about 80 g colloidal silica (LUDOX® AS-30) was added. About 3-6 g water was added to the mixture. The mixtures were extruded to form ⅛-inch cylindrical-shaped extrudates. The extrudates were calcined at 530° C. for 10 h in air. The preparation was repeated using different PVA1 with varying average molecular weights. The amounts and materials used are presented in Table 2.

The crush strengths of samples of all examples in the present invention were measured by using a Dilon SnapShot platform attached with Mecmesim AFG 500N advanced force gauge. Crush strengths of the extrudates were measured for the calcined samples without additional heating prior to the measurement. The crush strength of an extrudate sample was measured by placing each of 10-12 pieces of extrudate (sizes between 4 to 6 mm lengths) on a flat plate and then applying a compressive load with a flat plate and measuring the force required to crush each piece between the two plates. The averaged value of force per unit of extrudate length (lb/mm) of the 10-12 measurements was used.

The average crush strength for 12 samples of Comparative Example 1 was 1.77 lb/mm, with a standard deviation of 0.125 lb/mm.

TABLE 2

| Extrudate No. | Material Used, g | | | | | Polyvinyl Alcohol (PVAl) | | wt % Binder | Crush Strength, lb/mm |
| --- | --- | --- | --- | --- | --- | --- | --- | --- | --- |
| | Ge-ZSM-5 | MUG | Ludox AS-30 | $H_2O$ | PVAl | Avg MW | % Hydrolyzed[1] | | |
| 1 | 80.19 | 12.18 | 81.77 | 5.3 | 1.671 | 18,000 | 98 | 32.56 | 1.66 |
| 2 (repeat of 1) | 80.21 | 12.11 | 80.83 | 5.2 | 1.672 | 18,000 | 98 | 32.33 | 1.81 |
| 3 (repeat of 1) | 80.18 | 12.12 | 82.00 | 4.8 | 1.673 | 18,000 | 98 | 32.57 | 1.98 |
| 4 | 80.22 | 12.20 | 81.7 | 4.1 | 1.673 | 40,500 | 98-99 | 32.55 | 1.65 |
| 5 (repeat of 4) | 80.24 | 12.12 | 81.86 | 5.0 | 1.673 | 40,500 | 98-99 | 32.53 | 1.75 |
| 6 (repeat of 4) | 80.14 | 12.12 | 81.11 | 5.0 | 1.672 | 40,500 | 98-99 | 32.41 | 1.79 |
| 7 | 80.21 | 12.20 | 81.7 | 3.7 | 1.673 | 93,500 | 99+ | 32.55 | 1.59 |
| 8 (repeat of 7) | 80.12 | 12.12 | 82.18 | 33 | 1.672 | 93,500 | 99+ | 32.62 | 1.84 |
| 9 | 80.11 | 12.13 | 80.5 | 4.6 | 1.677 | 166,000 | 99+ | 32.31 | 1.75 |
| 10 (repeat of 9) | 80.17 | 12.17 | 81.5 | 5.5 | 1.677 | 166,000 | 99+ | 32.51 | 1.98 |
| 11 (repeat of 9) | 80.20 | 12.13 | 81.84 | 3.1 | 1.671 | 166,000 | 99+ | 32.54 | 1.79 |
| 12 (repeat of 9) | 80.18 | 12.13 | 81.83 | 3.7 | 1.671 | 166,000 | 99+ | 32.54 | 1.64 |

[1]Percent acetate groups (R = $COCH_3$) in polyvinyl acetate is hydrolyzed to alcohol group (R = H) to form polyvinyl alcohol Comparative Example 2

Different mixtures of Ge-ZSM-5 zeolite were prepared using a solid binder material of Min-U-Gel® (MUG) and colloidal silica LUDOX® AS-30 (30 wt % solid in aqueous). Water was added as necessary to the mixtures. In the mixtures, Mg-stearate and graphite powder (C) were used as the extruding aid. The mixtures were extruded to form ⅛-inch cylindrical-shaped extrudates. The extrudates were calcined at 530° C. for 10 h in air. The materials, the amounts used, and crush strengths of the calcined extrudates are presented in Table 3.

TABLE 3

| Extrudate No. | Material Used, g | | | | | | wt % Binder | Crush Strength, lb/mm |
| --- | --- | --- | --- | --- | --- | --- | --- | --- |
| | Ge-ZSM-5 | MUG | Ludox AS-30 | $H_2O$ | Mg-Stearate | Graphite Powder | | |
| 13 | 40.27 | 6.11 | 41.9 | | 0.425 | 0.417 | 32.87 | 1.45 |
| 14 | 40.05 | 6.12 | 40.7 | 2.0 | 0.423 | 0.417 | 32.54 | 1.34 |
| 15 | 80.16 | 12.14 | 82.5 | 5.5 | 0.848 | 0.850 | 32.68 | 1.77 |

Example 3

The same procedure as described in Comparative Example 1 was used to form extrudates for Example 3. Different mixtures of zeolite powder and silica containing binder were prepared by using about 80 grams of Ge-ZSM-5 zeolite, about 12 grams of solid binder material of Min-U-Gel® (MUG) and about 80 g LUDOX® AS-30 (30 wt % solid in aqueous). To the mixtures was added about 1.67 grams of PVAc-PVA1 (N), wherein N (from 80% to 89%) is the percentage of acetate groups are hydrolyzed to alcohol and with varying average molecular weights. Water was also added to the mixtures. The mixtures were extruded to form ⅛-inch cylindrical-shaped extrudates. The extrudates were calcined at 530° C. for 10 h in air. The materials used and the amounts are presented in Table 4. Crush strength is presented in Table 4. The average crush strength for 12 samples was 2.30 lb/mm, with a standard deviation of 0.12 lb/mm.

TABLE 4

| Extrudate No. | Material Used, g | | | | | PVAc-PVAl (N) | | wt % Binder | Crush Strength, lb/mm |
| --- | --- | --- | --- | --- | --- | --- | --- | --- | --- |
| | Ge-ZSM-5 | MUG | Ludox AS-30 | $H_2O$ | PVAc-PVAl (N) | Avg MW | N | | |
| 16 | 80.36 | 12.21 | 80.7 | 3.7 | 1.679 | 9,500 | 80 | 32.32 | 2.21 |
| 17 (repeat of 16) | 80.20 | 12.19 | 82.0 | 4.2 | 1.674 | 9,500 | 80 | 32.60 | 2.31 |
| 18 (repeat of 16) | 80.20 | 12.13 | 79.11 | 3.33 | 1.673 | 9,500 | 80 | 32.01 | 2.44 |
| 19 | 80.12 | 12.20 | 83.0 | 4.0 | 1.671 | 18,000 | 87-89 | 32.82 | 2.19 |
| 20 (repeat of 19) | 80.19 | 12.16 | 81.7 | 4.5 | 1.674 | 18,000 | 87-89 | 32.53 | 2.50 |
| 21 (repeat of 19) | 80.22 | 12.15 | 81.43 | 4.7 | 1.676 | 18,000 | 87-89 | 32.47 | 2.42 |
| 22 (repeat of 19) | 80.16 | 12.13 | 81.18 | 3.0 | 1.672 | 18,000 | 87-89 | 32.43 | 2.27 |
| 23 | 80.15 | 12.10 | 82.75 | 5.1 | 1.670 | 40,500 | 87-89 | 32.71 | 2.27 |
| 24 (repeat of 23) | 80.15 | 12.13 | 81.08 | 4.1 | 1.673 | 40,500 | 87-89 | 32.41 | 2.13 |
| 25 | 80.18 | 12.13 | 81.13 | 6.8 | 1.672 | 166,000 | 87-89 | 32.41 | 2.43 |

TABLE 4-continued

| | Material Used, g | | | | PVAc-PVAl (N) | | | |
|---|---|---|---|---|---|---|---|---|
| Extrudate No. | Ge-ZSM-5 | MUG | Ludox AS-30 | $H_2O$ | PVAc-PVAl (N) | Avg MW | N | wt % Binder | Crush Strength, lb/mm |
| 26 (repeat of 25) | 80.14 | 12.13 | 81.72 | 4.3 | 1.672 | 166,000 | 87-89 | 32.53 | 2.23 |
| 27 (repeat of 25) | 80.17 | 12.12 | 82.84 | 4.4 | 1.674 | 166,000 | 87-89 | 32.74 | 2.22 |

Example 4

Different mixtures of Ge-ZSM-5 zeolite were prepared using a solid binder material of Min-U-Gel® (MUG) and colloidal silica LUDOX® AS-30 (30 wt % solid in aqueous). Water was added as necessary to the mixtures. In certain mixture samples, polyacrylamide, available as CYFLOC®, was used as the extrusion aid. Specifically, about 80 g of Ge-ZSM-5 zeolite were prepared using about 12 g of solid binder material of Min-U-Gel® (MUG) and about 82 g colloidal silica LUDOX® AS-30 (30 wt % solid in aqueous). About 1.67 g of polyacrylamide (Cyfloc) was added. Water was also added to the mixtures. The mixtures were extruded to form ⅛-inch cylindrical-shaped extrudates. The extrudates were calcined at 530° C. for 10 h in air. The materials used, the amounts, and crush strength of the calcined extrudates are presented in Table 5.

TABLE 5

| | Material Used, g | | | | | wt % Binder | Crush Strength, lb/mm |
|---|---|---|---|---|---|---|---|
| Extrudate No. | Ge-ZSM-5 | MUG | Ludox AS-30 | H2O | Cyfloc | | |
| 28 | 80.18 | 12.17 | 82.6 | 5.9 | 1.678 | 32.71 | 1.96 |
| 29 (repeat of 28) | 80.23 | 12.18 | 82.6 | 8.7 | 1.678 | 32.70 | 2.00 |
| 30 (repeat of 28) | 80.21 | 12.17 | 81.9 | 7.0 | 1.674 | 32.57 | 2.07 |
| 31 (repeat of 28) | 80.16 | 12.15 | 81.93 | 5.9 | 1.675 | 32.58 | 1.99 |

As can be seen there was very little variation in the crush strengths of those samples employing a polyacrylamide extrusion aid. The crush strengths remained in a very narrow range of from 1.96 lb/mm to 2.07 lb/mm.

The crush strengths of repeat samples shown in Tables 2 and 4 were averaged (for repeat extrudates) and plotted in FIG. 1 as a function of average molecular weight of the extrusion aids used. The (average) MW of the extrusion aids had little impact on the crush strength of extrudates made by using either PVAc or PVAc-PVAl (80-89). The use of PVAc-PVAl (80-89) however, improved the crush strength compared to near complete hydrolyzed PVAl.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of forming a zeolite shaped body comprising:
preparing a mixture containing a zeolite comprising ZSM-5, ZSM-11, ZSM-23, Silicalite, Mordenite, Beta, Zeolite-L, Zeolite X, Zeolite Y, or a combination comprising at least one of the foregoing, a silica binder material and an extrusion aid of at least one of PVAc-PVAl (80-89) and polyacrylamide;
forming the mixture into a body of selected shape; and
heating the body to form the zeolite shaped body; and wherein the zeolite shaped body has an average crush strength of greater than or equal to 2 lb/mm.

2. The method of claim 1, wherein:
the silica binder material comprises solid silica and colloidal silica.

3. The method of claim 1, wherein the step of heating the shaped body includes calcining.

4. The method of claim 1, wherein extrusion aid comprises the PVAc-PVAl (80-89) and the PVAc-PVAl (80-89) has an average molecular weight (MW) of from 500 to 500,000.

5. The method of claim 1, wherein the silica binder material is used in an amount so that the zeolite shaped body has from 10% to 60% silica binder by weight of the zeolite shaped body.

6. The method of claim 1, wherein the extrusion aid is used in an amount of from 0.1% to 5% by weight of the mixture.

7. The method of claim 1, wherein the extrusion aid is used in an amount of from 1% to 2% by weight of the mixture.

8. The method of claim 1, wherein any non-silica binder materials are used in an amount to provide less than 10% by total weight of the zeolite shaped body.

9. The method of claim 1, wherein any non-silica binder materials are used in an amount to provide less than 5% by total weight of the binder materials in the zeolite shaped body.

10. The method of claim 1, wherein any non-silica binder materials are used in an amount to provide less than 1% by total weight of the binder materials in the zeolite shaped body.

11. The method of claim 1, wherein the zeolite contains a structure directing templating agent.

12. The method of claim 1, wherein the zeolite is non-acidic.

13. The method of claim 1, wherein the mixture further comprises at least one other extrusion aid that is not the PVAc-PVAl (80-89) or the polyacrylamide extrusion aid.

14. The method of claim 13, wherein the at least one other extrusion aid is selected from the group consisting of a PVAl, a PVAc, a PVAc-PVAl hydrolyzed to a level outside of the range of 80%-89%, magnesium stearate, carbon, and graphite powder.

15. A method of forming a zeolite shaped body comprising:
preparing a mixture containing a zeolite comprising ZSM-5, ZSM-11, ZSM-23, Silicalite, Mordenite, Beta, Zeolite-L, Zeolite X, Zeolite Y, or a combination comprising at least one of the foregoing, a silica binder material and an extrusion aid of PVAc-PVA1 (80-89);

forming the mixture into a body having a selected shape; and heating the body to form the zeolite shaped body.

16. The method of claim 15, wherein the zeolite is non-acidic.

17. The method of claim 15, wherein the silica binder material is used in an amount so that the zeolite shaped body has from 10% to 60% silica binder by weight of the zeolite shaped body.

18. The method of claim 15, wherein the extrusion aid is used in an amount of from 0.1% to 5% by weight of the mixture.

19. A method of forming a zeolite shaped body comprising:
preparing a mixture containing a zeolite comprising ZSM-5, ZSM-11, ZSM-23, Silicalite, Mordenite, Beta, Zeolite-L, Zeolite X, Zeolite Y, or a combination comprising at least one of the foregoing, a silica binder material and a polyacrylamide having an average molecular weight of from 2 million to 10 million;

forming the mixture into body having a selected shape; and heating the body to form the zeolite shaped body.

20. The method of claim 19, wherein the zeolite is non-acidic.

* * * * *